United States Patent

Stahl

[15] 3,661,531
[45] May 9, 1972

[54] PROCESS FOR ASSAY OF 2-HALOETHYLPHOSPHONIC ACID

[72] Inventor: Clarence Richard Stahl, Easton, Pa.
[73] Assignee: GAF Corporation, New York, N.Y.
[22] Filed: Aug. 31, 1970
[21] Appl. No.: 68,500

[52] U.S. Cl. ........................ 23/230 R, 23/230 M, 204/195 T
[51] Int. Cl. ............................................. G01n 31/16
[58] Field of Search ............. 23/230 M; 252/408; 204/195 T

[56] References Cited

UNITED STATES PATENTS 3,459,507  8/1969  Ord, Jr. ................................. 23/230 R

OTHER PUBLICATIONS

Gefter, " Analysis of Certain Oxychlorides of Certain Oxychlorides of Acids of Phosphorus," Analytical Abstracts, May 1959, Vol. 6, 1798. QD–71–A48

Primary Examiner—Morris O. Wolk
Assistant Examiner—R. E. Serwin
Attorney—Walter C. Kehm, Samson B. Leavitt, Martin A. Levitin and Homer J. Bridger

[57] ABSTRACT

A process for the assay of 2-haloethylphosphonic acid, containing such impurites as esters thereof, 2-hydroxyethylphosphonic acid, vinylphosphonic acid, and/or phosphoric acid, is described. The process comprises:

1. neutralizing an aqueous solution of a sample of 2-haloethylphosphonic acid to a pH in the range of about 8.5–9.6, preferably about 9.3.
2. boiling the neutralized solution for about ½ hour.
3. titrating the thus obtained solution with an alkali to a pH in the range of about 8.5–9.6 preferably about 9.3.

A preferred indicator, for the neutralization (1) and the titration (3), is Thymol Blue indicator, and a preferred alkali for said neutralization and titration is sodium hydroxide. The percent of 2-haloethylphosphonic acid in the sample can be computed from the amount of alkali consumed in the titration.

10 Claims, No Drawings

PROCESS FOR ASSAY OF 2-HALOETHYLPHOSPHONIC ACID

The present invention relates to an improved process for the assay of 2-haloethylphosphonic acid, particularly 2-chloroethylphosphonic acid.

2-haloethylphosphonic acids are known in the art as valuable plant growth regulators in the agricultural field. As described, for example, in an article in the publication Nature, Vol. 218, page 974 (1968) by Cooke and Randall, when a 2-haloethylphosphonic acid, particularly 2-chloroethylphosphonic acid, is applied to living plants, such as pineapples and soybeans, it is hydrolyzed and releases ethylene and exerts a number of beneficial effects as a plant growth regulator or hormone, including substantially increased yield of the fruit or vegetable to which it is applied.

Depending on the particular method of synthesis of the 2-haloethylphosphonic acid, and its purification if any, it usually contains varying amounts of such other materials as the anhydride of the free acid, esters of the acid (particularly the monoester thereof), 2-hydroxyethylphosphonic acid, and dehydrohalogenation products, vinylphosphonic acid or its polymers, and possibly some phosphoric acid.

Thus a convenient method of synthesis of 2-haloethylphosphonic acids involves the hydrolysis, or more preferably a cleavage or displacement reaction, of a diester of a 2-haloethylphosphonic acid. While this is conveniently carried out as a unitary "one-step" process, it involves two sequential reactions, in the first of which the diester is converted to the monoester as represented in Eq. I below, and in the second of which the monoester is converted to the free acid as represented in Eq. II, (using HCl in the process).

Eq. I
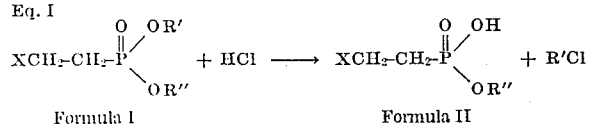
Formula I         Formula II

Eq. II
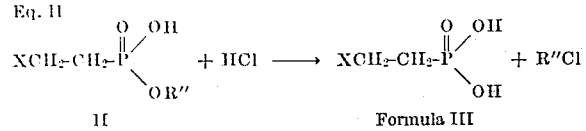
II                Formula III wherein: X represents halogen, e.g., chlorine or bromine and R' and R'' each represents an alkyl or haloalkyl group, preferably of one to six carbon atoms.

This process is readily carried out to the point where the first reaction, represented by Eq. I, has been completed and there is obtained a mixture of 2-haloethylphosphonic acid and its monoester. However as the reaction is carried further, there is a tendency for hydrolysis and dehydrohalogenation to take place with the formation of increasing amounts of 2-hydroxyethylphosphonic acid and/or vinylphosphonic acid as the second reaction, represented by Eq. II, proceeds further and the amount of monoester in the reaction mixture further decreases. Some of the anhydride of 2-haloethylphosphonic acid may also be formed.

While the anhydride of 2-haloethylphosphonic acid is the full equivalent of the 2-haloethylphosphonic acid itself, (since it readily hydrolyzes to the free acid when a product containing the anhydride is applied to plants from an aqueous solution, and/or by the plant itself, and its presence, therefore, is not objectionable), it is important, in the case of material to be applied to food crops, that the amount of monoester, 2-hydroxyethyl phosphonic acid and/or vinylphosphonic acid in the material applied to the plants be below prescribed maximums. These latter materials when applied to plants hydrolyze much more slowly than does the 2-haloethylphosphonic acid or its anhydride, and they and/or their reaction products remain on the plants as long lasting residues.

It is therefore important to provide accurate analytical procedures for the determination of the amount of 2-haloethylphosphonic acid in material containing the same, both for following and controlling its synthesis and/or purification, and to assay material sold for application to plants to ascertain its activity.

While various analytical procedures have been suggested for the analysis of 2-haloethylphosphonic acids, accurate and reproducible results have been difficult to obtain since most of these procedures suffer from one or more of the following disadvantages: several analyses of the same product are required, highly skilled operators or special equipment, e.g., VPC and/or NMR equipment, which is not always readily available, are necessary, the time required to run them and/or interpret the results may be excessive. Unless combined with VPC or NMR or other applicable procedures, they do not distinguish between 2-haloethylphosphonic acid, 2-hydroxyethylphosphonic acid and vinylphosphonic acid.

It is therefore an object of the present invention to provide an accurate and simple method for analysis or assay of 2-haloethylphosphonic acid. A further object is to provide an analytical process which may be run and interpreted accurately by an operator of ordinary skill in the art. Other and further objects will be apparent as the present description progresses.

I have found that if an aqueous solution of a sample of 2-haloethylphosphonic acid and/or the anhydride of such acid, and which may contain such impurities as mono- and diesters of such acid, 2-hydroxyethylphosphonic acid, vinylphosphonic acid and/or phosphoric acid, is (1) neutralized to a pH in the range of about 8.5 to 9.6 preferably about 9.3, by the addition thereto of an alkali so as to convert the 2-haloethylphosphonic acid to its neutral salt; (2) the neutralized solution then heated, preferably to the boil, for about a half hour and then cooled, and (3) the cooled solution then titrated with a standardized alkali to essentially the same pH as that used in the initial neutralization step, i.e., to a pH in the range of about 8.5 to 9.6, preferably about 9.3 — the percentage of 2-haloethylphosphonic acid in the sample can be computed from the amount of alkali consumed in the final titration step specified. While theoretically any strong nonvolatile alkali could be used for the neutralization and/or titration steps specified, such as an alkali metal hydroxide or carbonate, e.g., lithium, potassium or sodium hydroxide or carbonate, or an alkaline earth metal hydroxide such as calcium hydroxide, I prefer to use standardized NaOH or KOH solutions in the range of 0.1 to 1.0 N alkali hydroxide. The present invention will therefore be hereinafter described in connection with the use of sodium hydroxide solution as my preferred alkali, although it is to be understood that potassium hydroxide solutions are fully equivalent thereto.

The process for the analysis of 2-haloethylphosphonic acid embraced by the present invention involves the steps of (1) converting the 2-haloethylphosphonic acid to its disodium salt, (2) decomposition of the disodium salt to ethylene, sodium chloride and monosodium phosphate and (3) titration of the monosodium phosphate to determine the amount of 2-haloethylphosphonic acid originally present. These steps and the reactions involved therein may be represented by the following equations: (using 2-chloroethylphosphonic acid in the process)

Step 1, Eq. III
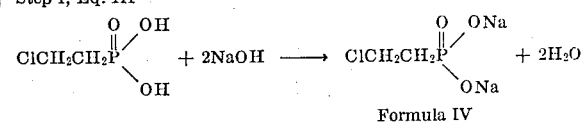
Formula IV

Step 2, Eq. IV
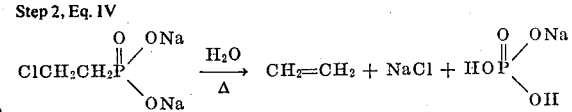

Step 3, Eq. V
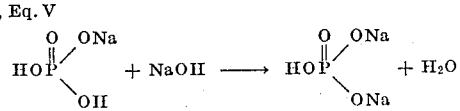

In step 1 (which is conducted as and may be considered as a titration, but is usually referred to herein as a "neutralization"

in order to clearly distinguish it from step 3 the 2-chloroethylphosphonic acid which is present in the sample is converted to the disodium salt thereof (formula IV in Eq. III) and any other acids present are also converted to their salts, thus any 2-hydroxyethylphosphonic acid is converted to its salt (formula V), any vinylphosphonic acid is converted to its salt (formula VI), and any monoester present is also converted to a salt (formula VII):

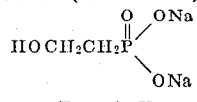 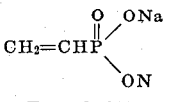 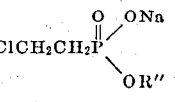

Formula V    Formula VI    Formula VII

Any phosphoric acid (or other mineral acid) present is converted to a salt, dibasic sodium phosphate, pH about 9.5 (or other inorganic salt). However, with the exception of the disodium salt of 2-chloroethylphosphonic acid which is formed from the 2-chloroethylphosphonic acid, I have found that all of the above salts (as well as any diester present) do not decompose to give titratable acid under the conditions used in the heating step 2. Therefore, when the cooled solution from the heating step 2 is titrated with NaOH in titration step 3 the amount of NaOH consumed in this titration is an accurate measurement of the amount of 2-chloroethylphosphonic acid present in the sample.

The percent of 2-chloroethylphosphonic acid may readily be computed in accordance with Eq. VI:

Eq. VI

Percent 2-chloro ethylphosphonic acid $$= \frac{\text{ml. of NaOH consumed in step 3} \times \text{N of NaOH} \times 144.5 \times 100}{\text{weight of sample (g.)} \times 1000}$$

Since, as stated previously, the anhydride of 2-chloroethylphosphonic acid is the full equivalent, in use, of the free acid, any hydrolysis of the anhydride to the free acid, its subsequent saponification and identification as the free acid, which may occur in the process of the present invention, is not necessarily objectionable. For most practical purposes, it is not essential to distinguish between the free acid and its anhydride. However, if the sample is suspected of containing the anhydride (in more than trace amounts), it is preferable, in order to assure reliable results and assure identification of the total 2-chloroethylphosphonic acid, i.e., that present as such + that present as its equivalent anhydride in the original sample, to first subject the original sample to an intentional hydrolysis as outlined in Eq. VII:

Eq. VII

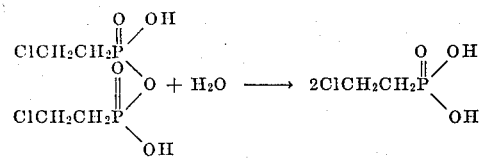

Such hydrolysis can be effected conveniently by adding about 1 ml. of distilled water to each 1-2 g. of sample and heating on a steam bath for about 15 minutes. When such a hydrolyzed sample is analyzed by the process of the present invention the total 2-chloroethylphosphonic acid content of the sample is accurately ascertained.

The details of the present invention will be apparent to those skilled in the art from a consideration of the detailed description of my preferred procedure given as Example 1 below and further illustrated in Examples 2 and 3.

EXAMPLE 1

To assure uniformity, melt a representative sample of 2-chloroethylphosphonic acid to be analyzed and accurately weigh about 1.50 g. of the melted sample into a 250 ml. Erlenmeyer flask. Dissolve the sample in the flask in approximately 25 ml. of distilled water and add 10 drops of indicator, Thymol Blue Indicator: 0.1 gram of the sodium salt in 250 ml. distilled water (Changes to blue at pH 8.5–9.6). Neutralize (by titration) the solution in the flask to the blue end point with standard 0.5 N NaOH Gently boil the solution for one-half hour on a hot plate; the ethylene formed is allowed to escape. Cool the solution in the flask to room temperature. Titrate the acid formed to the blue indicator end point with standard 0.5 N NaOH. Calculate the percent (by weight) of 2-chloroethylphosphonic acid, originally present, as the free acid or its anhydride, in the sample in accordance with Eq. VI, above.

While my preferred analytical reagents are 0.5 N NaOH and Thymol Blue indicator as described above, equally accurate results may be obtained by neutralization and titration to a pH of about 9.3, by the use of NaOH or KOH of any desired concentration, and the use of a pH meter or other indicators effective for this pH range, such as Tropaeoli 000 no. 1., p-Xylenol blue, o-Cresolphthalein or α-Naphtholbenzin.

The accuracy of the process of the present invention is illustrated by the following examples.

EXAMPLE 2

A sample of 2-chloroethylphosphonic acid which had been analyzed by VPC and found to consist of 86.0 percent (by weight) of 2-chloroethylphosponic acid, 1.6 percent of the mono- β -chloroethyl ester of 2-chloroethylphosphonic acid, 5.6 percent of 2-hydroxyethylphosphonic acid, and 6.8 percent of non-volatile compounds, was melted and subjected to analysis by the process described in Example 1, as follows:

1.6309 g. of the molten sample was weighed into a 250 ml. Erlenmeyer flask and dissolved in 25 ml. of distilled water.

10 drops of Thymol Blue indicator was added thereto.

The solution in the flask was neutralized by titration with standard 0.5 N NaOH to the blue end point of the indicator.

The neutralized solution in the flask was heated to a gentle boil for one-half hour on a hot plate and then cooled to room temperature.

The solution in the flask was titrated with 0.5 N NaOH to the blue indicator end point; 19.55 ml. of the 0.5 N NaOH was consumed in this titration.

The percent of 2-chloroethylphosphonic acid originally present in the sample was calculated, in accordance with Eq. VI above, as follows:

Percent 2-chloroethylphosphonic acid $$= \frac{19.55 \times 0.5 \times 144.5 \times 100}{1.6309 \times 1000} = 86.6\%$$

These results thus were in agreement with the results obtained by VPC.

EXAMPLE 3

A sample of purified 2-chloroethylphosphonic acid (recrystallized from benzene) when analyzed by the procedure of Example 1 was found to be essentially 99.2 percent pure.

It will be appreciated that, while heating at a gentle boil for about one-half hour is preferably employed for the decomposition, step 2, of the process of the present invention, temperatures in the range of about 40° C to 100° C e.g., heating on a steam bath, accompanied if necessary by an increase in the time of heating, may be used. At about 100° C the decomposition, represented by Eq. IV above, is completed in somewhat less than one-half hour, but a half hour period of heating is preferably used for convenience. Since ethylene is generated in the decomposition of the disodium salt of 2-chloroethylphosphonic acid, the cessation of the evolution of ethylene may be taken as evidence of completion of this reaction. Also while the 2-chloroethylphosphonic acid content of the sample is preferably expressed on a percentage basis, it will be apparent that suitable conversion tables may be prepared and used in place of the actual computation of Eq. VI, or if desired the 2-chloroethylphosphonic acid content of the sample may be expressed as a "saponification" value. Various other modifications will suggest themselves to those skilled in the art and may be adopted without departing from the spirit of this invention or the scope of the appended claims.

I claim:

1. The process of assaying a 2-haloethylphosphonic acid which comprises:
    1. neutralizing an aqueous solution of a weighed sample of 2-haloethylphosphonic acid by adding an alkali thereto to adjust the pH of said solution to the range of about 8.5 to about 9.6, whereby said 2-haloethylphosphonic acid is converted to its alkali salt,
    2. heating the thus formed solution to a temperature in the range of about 40° C to about 100° C to thereby decompose said alkali salt of said 2-haloethylphosphonic acid into ethylene, alkali halide and monobasic alkali phosphate, and
    3. titrating the thus obtained solution by adding a standardized alkali thereto to adjust the pH of said solution to the range of about 8.5 to about 9.6, whereby said monobasic alkali phosphate is converted to a dibasic alkali phosphate, whereby the amount of 2-haloethylphosphonic acid present in said sample may be determined.

2. The process as defined in claim 1 wherein the alkali specified in steps 1 and 3 is an alkali metal hydroxide.

3. The process as defined in claim 1 wherein the 2-haloethylphosphonic acid specified is 2-chloroethylphosphonic acid.

4. The process as defined in claim 3 wherein the alkali specified in steps 1 and 3 is sodium hydroxide.

5. The process as defined in claim 3 wherein the alkali specified in steps 1 and 3 is potassium hydroxide.

6. The process as defined in claim 1 wherein the amount of said 2-haloethylphosphonic acid present in said sample is determined as percent by weight thereof calculated according to the equation:

$$\text{Percent 2-haloethylphosphonic acid} = \frac{\left(\begin{array}{c}\text{ml. of alkali}\\ \text{consumed in}\\ \text{step 3}\end{array}\right) \times \left(\begin{array}{c}\text{normality of}\\ \text{alkali used}\\ \text{in step 3}\end{array}\right) \times \left(\begin{array}{c}\text{MW of 2-halo-}\\ \text{ethylphos-}\\ \text{phonic acid}\end{array}\right) \times 100}{\text{weight of sample in grams} \times 1000}$$

7. The process as defined in claim 6 wherein the alkali specified in steps 1 and 3 is an alkali metal hydroxide.

8. The process as defined in claim 6 wherein the 2-haloethylphosphonic acid specified is 2-chloroethylphosphonic acid.

9. The process as defined in claim 8 wherein the alkali specified in steps 1 and 3 is sodium hydroxide.

10. The process as defined in claim 8 wherein the alkali specified in steps 1 and 3 is potassium hydroxide.

* * * * *